April 13, 1937.    G. W. LEWIS    2,076,954
ENGINE
Filed Nov. 18, 1933    2 Sheets-Sheet 1
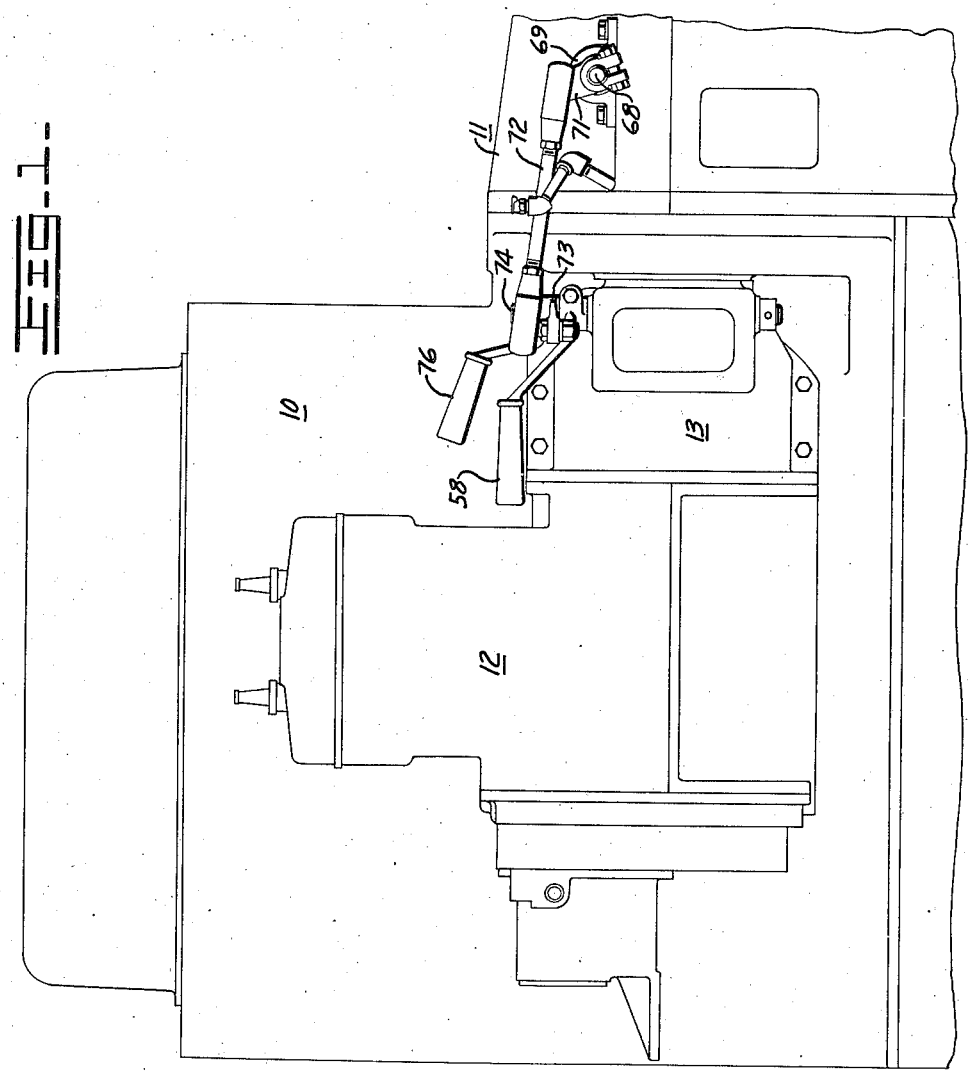
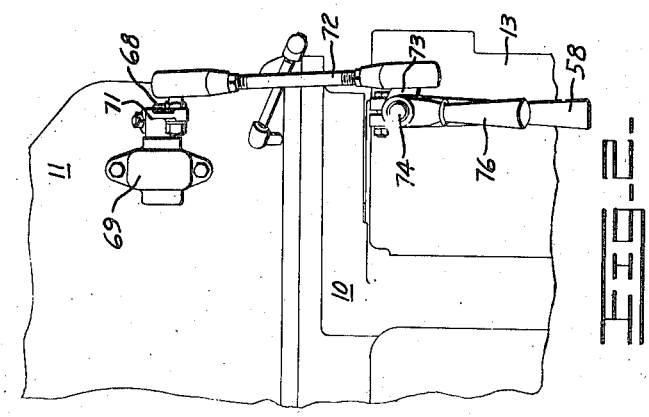
INVENTOR.
George W. Lewis
BY
ATTORNEY.

April 13, 1937.  G. W. LEWIS  2,076,954

ENGINE

Filed Nov. 18, 1933  2 Sheets-Sheet 2

INVENTOR.
George W. Lewis
BY Charles M. Hager
ATTORNEY.

Patented Apr. 13, 1937

2,076,954

UNITED STATES PATENT OFFICE 2,076,954

ENGINE

George W. Lewis, San Leandro, Calif., assignor to Caterpillar Tractor Co., San Leandro, Calif., a corporation of California Application November 18, 1933, Serial No. 698,675

16 Claims. (Cl. 74—6)

Statement of invention

The present invention relates to compression ignition and the like engines, such as a Diesel, for example, and more particularly to the provision of a reliable starting system therefor.

It is an object of the invention to provide a reliable starting system for a compression ignition and the like engine, which is adapted to maintain the starting drive therefor until positive starting is accomplished.

Another object of the invention is to provide a starting system for a compression ignition and the like engine, including a latched drive connection.

Another object of the invention is to provide a drive connection between an auxiliary starting engine and a primary engine which is positively maintained in operative relation until such time as positive starting of the primary engine is accomplished.

Another object of the invention is to provide a drive connection between an auxiliary starting engine and a primary engine which is positively maintained in operative relation, and automatically released when the primary engine reaches a predetermined speed of operation, such speed of operation being above that acquired by virtue of operation of the starting engine.

Another object of the invention is to provide a drive connection which is latched in operative position by virtue of the enablement thereof, and which is automatically disabled upon operation thereof above a predetermined speed.

Another object of the invention is to provide a starting system for a compression ignition and the like engine which is unaffected by rolling of the primary engine in starting, or by preliminary firing of one or more of the cylinders of the primary engine.

Other objects will appear as the description progresses.

Description of figures

Fig. 1 is a side elevation of a tractor power plant comprising a compression ignition and the like engine, and an auxiliary starting engine therefor, the drive connection between the engines being constructed in accordance with the instant invention.

Fig. 2 is a fragmentary plan view of the starting controls.

Description of mechanism

Figure 3:
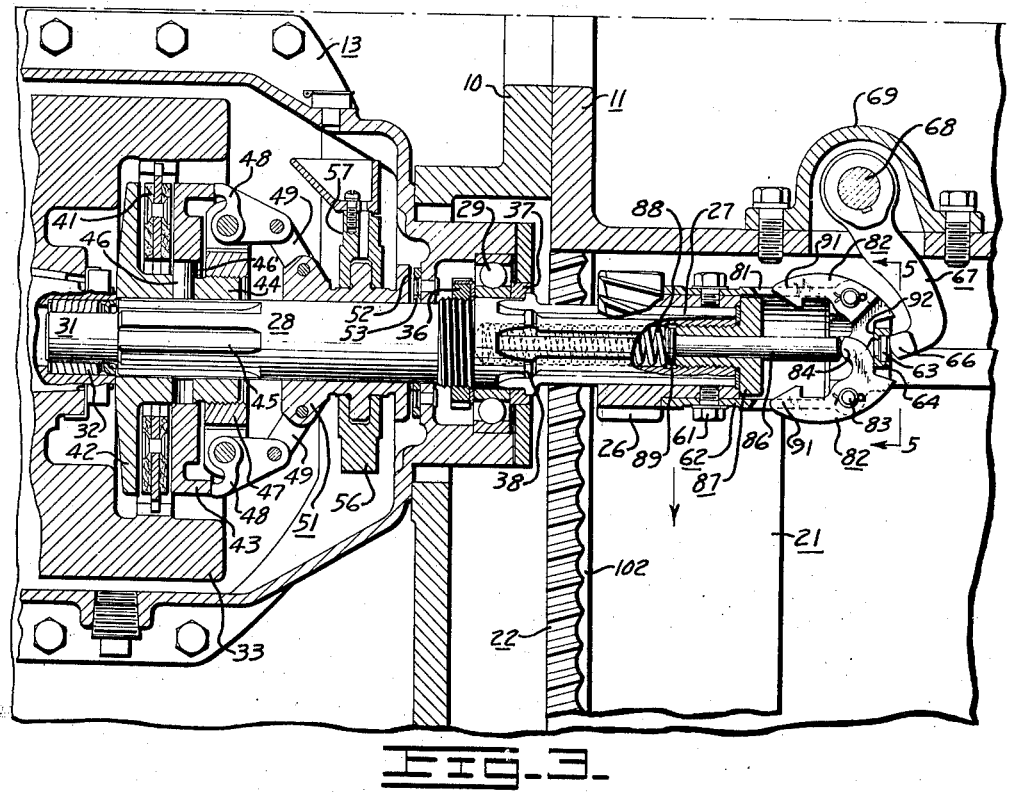
Fig. 3 is a vertical longitudinal section through the drive connection.

The power plant disclosed herein includes a primary compression ignition engine (Fig. 1) and an auxiliary starting engine therefor which is preferably of the spark ignition type. The primary engine includes block 10, having transmission case 11 secured thereto. The auxiliary engine includes block 12 mounted on primary engine block 10, and clutch housing 13 secured to engine blocks 10 and 12. An opening in housing 13 communicates with the interior of transmission case 11 providing a passage for the drive connection between the engines.

Starting systems of the type described above are disclosed generally in the co-pending application of Carl G. A. Rosen, Serial No. 693,595, filed October 14, 1933. The drive connection between such engines is usually in the form of a Bendix drive unit, including a spring-pressed shiftable pinion which engages a gear on the flywheel of the primary engine. As is well known, in such drive units, the driving engagement of the pinion and gear is maintained by virtue of the driving engagement of the shiftable pinion with the flywheel gear, said pinion maintaining itself in its displaced position by virtue of its greater peripheral speed of rotation. When the flywheel gear of the primary engine moves at a greater peripheral speed, the shiftable pinion of the Bendix drive unit or the like, is automatically disengaged from the flywheel gear, such disengagement being intended only when the primary engine is started. However, it has been found that in starting such engines, a definite roll is developed by the engine due to the expanding air after a cylinder is placed under compression or due to partial firing of the cylinders, such rolling imparting a greater peripheral speed to the flywheel gear than that of the shiftable pinion, whereby the shiftable pinion is disengaged therefrom at undesirable times and must again be shifted into engagement therewith. Re-engagement is automatically attempted when the starting engine is in operation, and, hence, damage to the gear and pinion is very apt to result. In any event, the delay in starting and the annoyance caused by such disengagement have proven very undesirable. It will be readily seen that in compression ignition and the like engines, rolling is more pronounced due to the high compression pressure developed in the cylinders.

The instant invention eliminates the disadvantages noted above by providing a drive connection which is positively maintained in engaged position until such time as the primary engine is positively in operation as a fuel burning engine. More specifically, the invention includes positive latch means for maintaining the drive connection between the engines enabled, said latch means being disabled automatically when the primary engine operates at or above a predetermined speed.

The primary compression ignition engine includes flywheel 21 (Fig. 3) disposed within transmission case 11 and having gear 22 thereon. Gear 22 is adapted to be engaged by pinion 26 splined on end portion 27 of shaft 28. Shaft 28 is journalled in bearing 29 in clutch housing 13, and at a reduced end 31 thereof, in bearing 32 in flywheel 33 of auxiliary engine 12. Bearing 29 is held between nut 36, and retainer 37 seated over annularly spaced projections 38 on shaft 28.

Clutch means is provided to drive shaft 28 selectively from the auxiliary engine, to transmit the drive to the primary engine. Flywheel 33 has a driving connection with clutch element 41 interposed between spaced apart clutch elements 42, 43, forming the driven elements of the clutch means. Clutch element 42 has hub 44 engaging splined portion 45 of shaft 28, and clutch element 43 is slidably mounted on said hub 44 by means of pin 46 fixed to hub 44 and engaging in a slot 46' in element 43. Spider 47 adjustably threaded on hub 44 carries a plurality of cam levers 48 adapted for engagement with element 43 to cause shifting thereof and engagement of the clutch. Cam levers 48 are operated through respective links 49 from shiftable collar 51. Collar 51 has face 52 adapted for engagement with brake 53 to stop rotation thereof and of the driven clutch elements upon disengagement of the clutch. Movement of collar 51 on shaft 28 is controlled through forks 56, 57 by a suitable connection from lever 58 (Fig. 1). It is seen, therefore, that a clutch controlled drive is provided from the auxiliary starting engine to the shiftable driving pinion 26.

Manually operable control means are provided for engaging the shiftable pinion 26 with the gear 22 on the primary engine flywheel. Pinion 26 (Figs. 3 and 4) is secured by screws 61 to sleeve 62, which beyond said pinion has button 63 mounted centrally thereof in solid end portion 64 opposite said pinion 26. Button 63 is engaged by nose 66 of lever 67 keyed on shaft 68 mounted in cover 69 on case 11 (Figs. 1 and 3). Shaft 68 (Figs 1 and 2) extends without cover 69 and has arm 71 keyed and clamped thereon, having a ball and socket connection with adjustable link 72, the opposite end of which has a ball and socket connection with arm 73 on shaft 74. Arm 73 is connected to control lever 76 by means of which pinion 26 (Figs. 3 and 4) can be engaged with flywheel gear 22 as illustrated in Fig. 4.

Latching means are provided which is automatically enabled upon movement of the pinion 26 into engagement with the flywheel gear 22. Sleeve 62 (Figs. 3 and 5) has opposite longitudinal slots 81 in which opposite latching levers 82 are pivotally mounted on pins 83; the pins 83 being mounted and being cotter-held in suitable bosses in sleeve 62. Inner ends 84 of levers 82 converge inwardly to engage the end of a plunger 86 slidably mounted in nut 87 threaded in shaft 28. The head of nut 87 forms an abutment for cooperation with the latching elements. The inner end of plunger 86 is engaged by spring 88 seated in recess 89 in shaft 28, the spring 88 urging said plunger 86 against ends 84 of levers 82, whereby outer hooked latching ends 91 of said levers can be resiliently maintained in operative position; flats 92 of levers 82 engaging end portion 64 of sleeve 62.

Figures 4, 5:
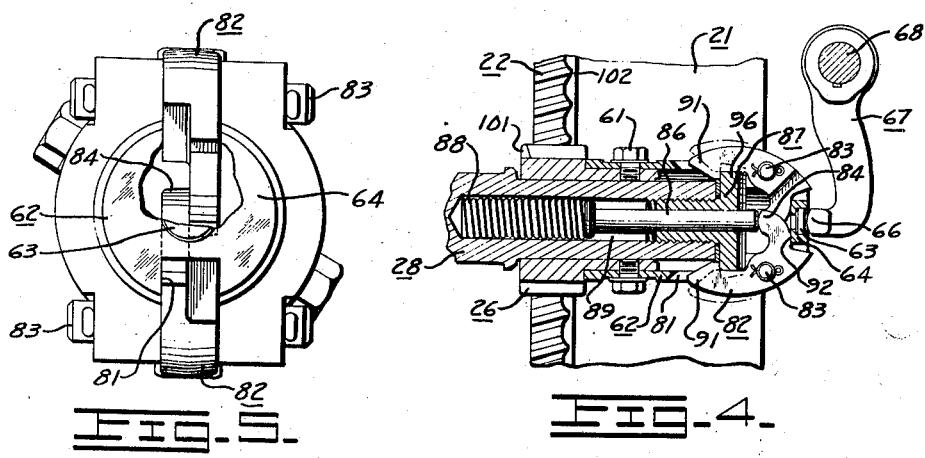
Fig. 4 is a fragmentary section similar to Fig. 3 showing the drive connection in engaged position.
Fig. 5 is a fragmentary end elevation taken on the line 5—5 in Fig. 3.

Upon oscillation of control lever 76 to effect engagement of the drive connection, pinion 26 and sleeve 62 are moved to the left from the normally inactive position shown in Fig. 3 to the active position shown in Fig. 4. This movement causes hooks 91 of levers 82 to ride over, and engage behind head 96 of nut 87, and the spring 88 to become compressed by plunger 86. Thus, it is seen that due to the action of spring 88 against plunger 86 which bears against inner ends 84 of levers 82, latching levers 82 are held automatically in latched position upon engagement of the shiftable pinion 26 with the primary engine gear 22. After such shifting movement, control lever 76 is returned to normal inoperative position. Thus, engagement of pinion 26 and gear 22 is effected manually before shaft 28 is rotated by the starting engine. After such engagement, the drive from the starting engine to shaft 28 is effected by engagement of the clutch through control lever 58.

The driving engagement between pinion 26 and gear 22 is maintained until the rotation of pinion 26 and sleeve 62 reaches such a speed, that the centrifugal action on hooks or noses 91 of levers 82 overcomes the latching action of spring 88 and moves levers 82 to inoperative position; the desired speed being predetermined by the strength of spring 88 and the weight distribution of levers 82. Levers 82 are shown in phantom line position in Fig. 4 when the centrifugal action thereon has moved them a sufficient amount so that spring 88 can move shiftable pinion 26 out of engagement with gear 22. In this connection, it will be noted that when levers or latching members 82 commence to move under the action of centrifugal force, from the full line position to the dotted line position of Fig. 4, their inner ends 84 move inwardly, because of the intermediate pivots 83, to thrust plunger 86 inwardly and compress spring 88. Hence, spring 88 becomes energized by this action; so that when lever ends 91 become fully disengaged from latching abutment 87, the spring 88 is able to thrust gear or pinion 26 quickly out of driving engagement with gear 22, to preclude breakage of the starting mechanism. When the centrifugal action is insufficient to cause disengagement of the latching members 82 from latching abutment 87, namely, when gear 22 is not rotating at a high speed determined by operation of the main engine under its own power, spring 88 by acting against the inner ends of levers 82 holds such levers in latched position, to insure that gears 26 and 22, when first engaged to establish a drive, will remain engaged as long as it is necessary to drive the main engine for initiating operation thereof under its own power. Thus, spring 88 acts always to urge gear or pinion 26 in a direction away from latching engagement, and the latching means into latching engagement.

Preferably, pinion 26 is a helical pinion, and gear 22 is a helical gear, the angle of the teeth being such that when pinion 26 is driving, the camming effect of the teeth urges pinion 26 to its engaged position; and, vice versa, when gear 22 is driving, the camming effect of the teeth urges pinion 26 to disengaged position. The teeth of gear 22 and pinion 26 are preferably bevelled at 101, 102, respectively, to facilitate engagement thereof, the bevelled faces of the teeth preventing jamming by rotating pinion 26 a sufficient amount to permit free meshing of the teeth.

The helical construction of the teeth of the gear and pinion, although desirable, is not necessary to accomplish disengagement of the pinion from the gear, as the action of spring 88 and levers 82 will accomplish this purpose alone. However, such camming action is preferred because it aids to effect the disengagement, and is sufficient to cause the disengagement alone should spring 88 become broken. Thus, auxiliary means are provided for causing automatic disengagement of the gear and pinion on movement of the latching means to inoperative position, such auxiliary means being effective to aid the action of the primary means or to supplant such primary means when necessary.

It is seen, therefore, that the instant invention provides a starting drive connection between an auxiliary starting engine and a primary compression ignition engine which is reliable in operation, and which remains operatively engaged until starting of the primary engine as a fuel burning engine is positively accomplished.

I therefore, claim as my invention:

1. The combination with an engine having a rotatable gear, of starting mechanism for said engine, comprising an axially shiftable rotatably mounted gear, a latching abutment, a latching member, means connecting said latching member for shifting and rotatable movement with said second mentioned gear, said latching member being mounted for oscillatory movement on said means, resilient means acting against one end of said latching member, and means formed at the opposite end of said latching member for engagement with said abutment.

2. The combination with a primary motor, and a starting motor therefor; of means including a movable member for establishing a drive connection between said motors, means for latching said member in drive establishing position, and resilient means serving both to urge said member in a direction away from said drive establishing position and to hold said latching means in latching engagement at said drive establishing position.

3. The combination with a primary motor, and a starting motor therefor; of means including a movable member for establishing a drive connection between said motors, means for latching said drive connection in operative position, and resilient means serving both to urge said member in a direction away from said drive establishing position and to hold said latching means in latching engagement at said drive establishing position, said latching means being automatically disengageable upon operation of said primary motor at a predetermined speed whereby said resilient means can thrust said member away from said drive establishing position to interrupt said drive.

4. The combination with a primary motor, and a starting motor therefor; of means including a movable member for establishing a drive connection between said motors, manually operable means for moving said member to drive establishing position, means for latching said member in drive establishing position, and resilient means serving both to urge said member in a direction away from said drive establishing position and to hold said latching means in latching engagement at said drive establishing position, said latching means being automatically disengageable upon operation of said primary motor at a predetermined speed, whereby said resilient means can thrust said member away from drive establishing position to interrupt said drive.

5. The combination with an engine having a rotatable member, of starting mechanism for said engine, comprising an axially shiftable rotatably mounted member, means for effecting engagement of said members, latching means for holding said members in engaged position, said latching means being automatically disengageable under the action of centrifugal force, and means energized by movement of said latching means to disengaged position for causing disengagement of said members.

6. The combination with a primary engine and an auxiliary starting engine therefor; of a drive connection between said engines, comprising a non-shiftable gear connected to said primary engine, a shiftable gear connected to said auxiliary engine and movable to engage said non-shiftable gear, resilient means urging said shiftable gear to disengaged position, and latch means for said shiftable gear urged to latching position by said resilient means.

7. The combination with a primary engine and an auxiliary starting engine therefor; of a drive connection between said engines, comprising a non-shiftable gear connected to said primary engine, a shiftable gear connected to said auxiliary engine and movable to engage said non-shiftable gear, resilient means urging said shiftable gear to disengaged position, latch means for said shiftable gear urged to latching position by said resilient means, and means mounting said latch means for centrifugal action against the action of said resilient means to unlatch said shiftable gear and to initiate movement of said shiftable gear to disengaged position.

8. The combination with a primary engine having a gear adapted to transmit a drive thereto, and an auxiliary engine having a shaft driven thereby; of a second gear rotatable with and movably mounted on said shaft for engagement with and disengagement from said first gear, an abutment positioned to provide a stop for the second gear in a disengaged position thereof, and latch means supported for movement with said second gear and engageable with said abutment to maintain said second gear in engaged position.

9. The combination with an engine having a rotatable gear, of starting mechanism for said engine, comprising a rotatable gear mounted for shifting movement into driving engagement with said first-mentioned gear, a latching abutment, a latching member pivotally mounted intermediate its ends to provide for oscillatory movement thereof, resilient means acting on one end of said member and on said second-mentioned gear in a direction to move said second-mentioned gear out of said driving engagement, and means formed adjacent the opposite end of said latching member for engagement with said abutment.

10. Starting mechanism for an engine having means to transmit a drive thereto, comprising a rotatable member movably mounted for driving engagement with and disengagement from said means, mechanism mounted for rotation with said member for latching said member in such driving engagement with said means and automatically disengageable under the action of centrifugal force, and resilient means urging said member in a direction away from the driving engagement position and urging said latching mechanism to latched position.

11. Starting mechanism for an engine having means to transmit a drive thereto, comprising a member positionable for driving engagement with said means, means for mounting said member for rotation and for movement into and out of the driving engagement position, resilient means resisting movement of said member into the driving engagement position to thereby urge said member in a direction away from the driving engagement position, and mechanism mounted for rotation with said member for latching said member in the driving engagement position and automatically disengageable under the action of centrifugal force, said mechanism including a part mounted for oscillatory movement and acting against said resilient means.

12. Starting mechanism for an engine having means to transmit a drive thereto, comprising a member positionable for driving engagement with said means, means for mounting said member for rotation and for movement into and out of the driving engagement position, means for latching said member in the driving engagement position and automatically disengageable under the action of centrifugal force, and resilient means urging said member in a direction away from the driving engagement position and urging said latching means into latching engagement whereby movement of said latching means from disengaged position energizes said resilient means to thrust said member in a direction away from the driving engagement position.

13. Starting mechanism for an engine having means to transmit a drive thereto, comprising a gear rotatable about an axis and mounted for movement along said axis for driving engagement with and disengagement from said engine means, a member pivoted intermediate its ends and having means at one side of the pivot for latching said gear in driving engagement position with said engine means, means mounting said latching member for rotation about said axis to provide for pivotal movement of said member under the action of centrifugal force to effect unlatching thereof, and resilient means urging said gear in a direction away from the driving engagement position and acting against said latching member at the opposite side of said pivot to urge said latching member into latching engagement.

14. Starting mechanism for an engine having means to transmit a drive thereto comprising a member rotatable about an axis and mounted for movement longitudinally of said axis for driving engagement with and disengagement from said means, a latching member, means for mounting said latching member for rotation with said rotatable member including a pivotal connection intermediate the ends of said latching member, the axis of said pivotal connection extending transversely with respect to said axis of rotation, and resilient means extending longitudinally with respect to said axis of rotation to thrust against one end portion of said latching member to urge the opposite end portion of said latching member toward latching position, said resilient means being so arranged with respect to said rotatable member as to be compressed thereby upon movement of said rotatable member from disengaged position to engaged position with said starting mechanism means whereby said resilient means operates against said latching member to enhance the latching effect.

15. Starting mechanism for an engine having means to transmit a drive thereto, comprising a member rotatable about an axis and movably mounted for driving engagement with and disengagement from said means, a latching member connected for rotation with said rotatable member, means for mounting said latching member to enable release thereof under action effected by such rotation, and resilient means extending longitudinally with respect to said axis of rotation and acting to urge said latching member toward latching position, said resilient means being so arranged with respect to said rotatable member as to be axially compressed thereby upon movement of said rotatable member from disengaged position to engaged position with said starting mechanism means whereby said resilient means operates against said latching member to enhance the latching effect.

16. The combination with a compression ignition and the like engine having a gear adapted to transmit a drive thereto, and a starting engine therefor, of drive establishing means between said engines comprising a splined shaft connected for rotation by said starting engine, a pinion splined on said shaft for axial movement therealong and for rotation therewith, manual means for moving said pinion into engagement with said gear, latching means connected for rotation with said pinion for holding said pinion in engagement with said gear, said latching means being automatically operable under the action of centrifugal force to release said gear, and resilient means for urging said pinion to disengaged position and for urging said latching means in a direction tending to maintain engagement between said pinion and said gear when they are engaged.

GEORGE W. LEWIS.